2,945,873
PROCESS FOR SEPARATING MIXTURES OF CHLOROSILANES

Lloyd H. Shaffer and Arthur N. Pines, Snyder, N.Y., assignors to Union Carbide Corporation, a corporation of New York No Drawing. Filed May 15, 1957, Ser. No. 659,228

21 Claims. (Cl. 260—448.2)

This invention relates to chlorosilanes and in particular to a process for separating specific chlorosilanes from mixtures of different chlorosilanes.

It is often desirable to separate mixtures of chlorosilanes of different functionalities into chlorosilane portions such that each portion contains only chlorosilanes of a specific functionality and is substantially free of chlorosilanes of other functionalities. Illustratively, trimethylchlorosilane, when produced by conventional means usually contains up to about 40 mole percent of chlorosilanes of higher functionality, e.g., tetrachlorosilane (i.e., silicon tetrachloride) and methyltrichlorosilane, based on the total moles of trimethylchlorosilane and such higher functional chlorosilanes. Trimethylchlorosilane is utilized for furnishing end-blocking groups (i.e. chain-terminating trimethylsiloxane groups) in the manufacture of silicone oils that consist predominantly of combined dimethylsiloxane units. The viscosity and tendency to gel of oils containing end-blocking groups furnished by trimethylchlorosilane decreases as the amounts of the tri- and tetra-functional chlorosilanes in the trimethylchlorosilane so used are reduced. Hence, it is desirable to reduce the amounts of tetrachlorosilane and methyltrichlorosilane contained by trimethylchlorosilane so that oils of even high viscosity containing end-blocking groups furnished by trimethylchlorosilanes can be manufactured without gelation.

As a further illustration, dimethyldichlorosilane, when produced by conventional means, usually contains about 0.3 to 5.0 mole percent of methyltrichlorosilane based on the total moles of the dimethyldichlorosilane and the methyltrichlorosilane. Dimethyldichlorosilane is useful in the production of oils. To produce polydimethylsiloxane of controlled viscosity and oils that are not prone to gelling, the amount of methyltrichlorosilane contained by dimethyldichlorosilane should be removed or reduced to a negligible quantity.

It is also often desired to separate mixtures of chlorosilanes having different organic substituents attached to silicon thereof into individual chlorosilane portions wherein each portion contains specific chlorosilanes having the same organic substituents attached to silicon thereof. Illustratively, in the manufacture of vinyl silicone elastomers the proportion of vinyl groups contained by the elastomer affects the properties of the elastomers. By controlling the amount of vinyl siloxane groups combined in the elastomers, the properties of such elastomers can be controlled substantially as desired. This can be advantageously accomplished by regulating the relative amounts of substantially pure vinyl chlorosilanes and co-reacting chlorosilanes. When low purity chlorosilanes are employed additional variables are encountered thus complicating an otherwise simple operation. Similarly, substantially pure diphenyldichlorosilane. dimethyldichlorosilane, methylphenyldichlorosilane, and the like are highly desirable.

Known physical methods, such as distillation, are often not well suited for the separation of mixtures of different chlorosilanes. By way of illustration, tetrachlorosilane and trimethylchlorosilane form an azeotrope and hence cannot be separated from each other by simple distillation. As a further illustration, some chlorosilanes, such as dimethyldichlorosilane and methyltrichlorosilane, boil at close to the same temperature and also are not readily separated from each other by simple distillation.

In order to separate mixtures of chlorosilanes, it had been proposed, heretofore, that a mixture containing two or more chlorosilanes and a compound such as a tertiary amine, a diorganodiacyloxysilane or an alkali metal hydroxide can be mixed and subjected to such conditions that one or more, but not all of the chlorosilanes react with the amine, the diorganodiacyloxysilane or the hydroxide to produce products that are appreciably higher boiling than the remaining unreacted chlorosilane or chlorosilanes. The remaining unreacted chlorosilane or chlorosilanes can then be removed from the reaction mixture by distillation. These latter-mentioned means of separating mixtures of different chlorosilanes are not entirely satisfactory because of incomplete separation, low yields and inability to separate low concentrations of chlorosilanes from the mixtures. The method wherein a tertiary amine is employed was not found to be generally applicable to separating mixtures of chlorosilanes but is limited to separating mixtures of only inorganic chlorosilanes. Diorganodiacyloxysilanes are not readily available materials and hence the process for separating mixtures of chlorosilanes using diorganodiacyloxysilanes entails the expenses of first synthesizing said diorganodiacyloxysilanes. When an alkali metal hydroxide is used in such separations, the materials obtained were higher boiling and are not found to be especially useful because of their basic character and contamination by salts.

It had also been suggested that zinc fluoride can be added to a mixture of two chlorosilanes to selectively convert one of the chlorosilanes to the corresponding fluorosilane. The fluorosilane so produced could then be separated from the unreacted chlorosilane by distillation. However, the fluorosilane so separated is not a particularly useful material in view of the fact that when it is subjected to hydrolysis reactions in the course of the production of polysiloxane materials therefrom, hydrogen fluoride is produced which is highly corrosive.

Still another process for separating mixtures of chlorosilanes had been suggested and includes adding a phenol to the mixture containing two or more chlorosilanes and applying such conditions that cause the chlorosilanes and phenol to react to form phenoxysilanes. The phenoxysilanes so made possess larger boiling point differences than the starting chlorosilanes and hence can be separated by distillation. However, the relatively high boiling points of these phenoxysilanes necessitate the use of high temperature distillation or vacuum distillation to effect a separation and regeneration of the separated phenoxysilanes to the corresponding chlorosilanes is required. Hence this method of separating mixtures of chlorosilanes is often undesirable.

Another process for separating mixtures of methylchlorosilanes had been suggested and includes adding an anhydrous salt of acetic acid to the mixture containing two or more chlorosilanes and applying such conditions that cause the methylchlorosilanes and the salt to react to form methylsilylacetates. The methylsilylacetates possess larger differences in their boiling points than the starting methylchlorosilanes and hence can be separated by distillation. However, the relatively high boiling points of these methylsilylacetates necessitate the use of high temperature distillation to effect separation and the regeneration of the methylsilylacetates to the corresponding chlorosilanes is required. Hence the method of separating mixtures of chlorosilanes is often undesirable.

This invention is based on the discovery that different chlorosilanes alcoholize, i.e., react with alcohols, at different rates and that mixtures of chlorosilanes may be separated into specific chlorosilane portions by taking advantage of this difference in reactivity. In accordance with the present invention, it has been found that chlorosilane mixtures containing a first chlorosilane part and a second chlorosilane part, the first chlorosilane part being more readily alcoholizable, i.e., more reactive with alcohols, than the second chlorosilane part, can be separated by a process that comprises reacting the chlorosilane mixture with not less than 1.0 mole of an alcohol per mole of the first chlorosilane part to form a mixture of an alcoholized chlorosilane part and an unalcoholized chlorosilane part, and separating the alcoholized and unalcoholized chlorosilane parts. By the term "alcoholized chlorosilane," as used herein, is meant the reaction product of the reaction between an alcohol and a chlorosilane, as represented by the following equation:

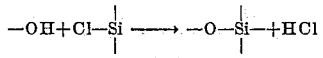

wherein, —OH represents the alcohol,

represents the chlorosilane and

represents the alcoholized chlorosilane. Each chlorosilane part can contain a single, specific chlorosilane or several specific chlorosilanes all of which alcoholize at rates above or below a certain value which distinguishes the first chlorosilane part from the second chlorosilane part. For example, the specific chlorosilane or chlorosilanes of the first chlorosilane part alcoholize at a rate above a certain value whereas the chlorosilane or chlorosilanes of the second chlorosilane part alcoholize at a rate below that value. When the second chlorosilane part comprises more than one specific chlorosilane, the process can be repeated to eliminate the more alcoholizable chlorosilanes of said second chlorosilane part. The process can be repeated as many times as desired or until a single specific chlorosilane has been obtained.

Our invention is applicable to all mixtures of chlorosilanes wherein the chlorosilanes differ in rates of alcoholysis. Among the many chlorosilane mixtures that can be separated by this invention are mixtures of chlorosilanes represented by the formula:

$$ClSiX_3$$

wherein X is a chlorine atom, a hydrogen atom or a monovalent hydrocarbyl group, particularly, an alkyl group, an aryl group, an alkenyl group, an alkaryl or an aralkyl group but is preferably a chlorine atom, a methyl group, an ethyl group, a vinyl group, or a phenyl group. By the term "hydrocarbyl group," as used herein, is meant a monovalent group composed of carbon and hydrogen. However, the hydrocarbyl groups, represented by X in the formula can be substituted or unsubstituted and, if substituted, the substituents can be a silyl group (e.g., a trichlorosilyl group), a cyano group, a halogen atom and the like. X can be the same or different throughout a particular chlorosilane molecule. Illustrative of the chlorosilanes represented by the formula are tetrachlorosilane, the alkylchlorosilanes, the arylchlorosilanes, the aralkylchlorosilanes, the alkenylchlorosilanes, the chlorohydrogensilanes and the like. This invention is especially applicable to the separation of mixtures of chlorosilanes that contain two or more members of the following classes of chlorosilanes: the methylchlorosilanes, the ethylchlorosilanes, the phenylchlorosilanes, the phenylmethylchlorosilanes, the vinylchlorosilanes and the ethylphenylchlorosilanes, as well as to the separation of chlorosilane mixtures of one or more members of these classes and tetrachlorosilanes. Illustrative of the mixtures of chlorosilanes that can be separated using the process of this invention are mixtures of trimethylchlorosilane and tetrachlorosilane, mixtures of dimethyldichlorosilane and methyltrichlorosilane, mixtures of phenylmethyldichlorosilane and phenyltrichlorosilane, mixtures of diethyldichlorosilane and butyltrichlorosilane, mixtures of bis(trichlorosilyl) ethane and phenyltrichlorosilane, mixtures of diphenyldichlorosilane and bis(trichlorosilyl) benzene and like mixtures. Although our process will separate chlorosilane mixtures containing any percentages of specific chlorosilanes, it is preferable to remove as much as possible of the more readily alcoholizable chlorosilane part by fractional distillation or other practical methods so as to concentrate the less alcoholizable part. This technique results in economies and higher yields of unalcoholized chlorosilanes.

Chlorosilanes, such as those represented by the formula,  were found to alcoholize, i.e., react with alcohols, at different rates. By way of illustration, it was found that methyltrichlorosilane reacts with alcohols faster than dimethyldichlorosilane, butyltrichlorosilane reacts with alcohols faster than diethyldichlorosilane, bis(trichlorosilyl) ethane reacts with alcohols faster than phenyltrichlorosilane, bis(trichlorosilyl) benzene reacts with alcohols faster than diphenyldichlorosilane, and tetrachlorosilane reacts with ethanol faster than trimethylchlorosilane. The reaction rates with alcohol of the chlorosilanes present in any chlorosilane mixture to be separated by this invention can be readily measured by known procedures. By way of illustration, the rates of reaction of chlorosilanes with alcohols may be measured conductometrically as well as by infra red techniques in accordance with methods known in the art.

The alcohols used in our process can be primary, secondary or tertiary. They can be aliphatic, cycloaliphatic or aromatic alcohols with only one or more alcoholic hydroxyl groups to the molecule. The term "alcohol," as used herein, denotes an organic compound containing a hydroxyl group bonded to a carbon atom to which no atoms other than carbon or hydrogen are attached and includes phenols as well as aliphatic and cycloaliphatic alcohols. Such alcohols can be represented by the formula:

$$ROH$$

wherein R is a monovalent aliphatic, cycloaliphatic, aromatic-substituted aliphatic, aromatic or aliphatic-substituted aromatic group composed of a carbon atom or group of carbon atoms interconnected by single or multiple bonds and to which such groups as hydrogen, alkyl, hydroxyl, and cyclic groups and the like or combinations thereof can be attached. R can represent, also, a carbon group which contains nitrogen to which other groups, for example, hydrogen, chlorine, alkyl, alkanol, nitro, alkoxy and the like may be attached or it may represent a carbon group which contains sulfur.  The presence of other groups not specifically listed herein and not capable of participating in side reactions with the chlorosilanes or the alcoholic hydroxyl groups during our process is by no means harmful to the efficiency of our process. Mixtures of alcohols or only one alcohol can be used in the process. Monohydric and dihydric, aliphatic, cycloaliphatic and aromatic alcohols of the type described above have been found to provide excellent results. Examples of these monohydric and dihydric, aliphatic and cycloaliphatic alcohols are those represented by the formula wherein R is a group from the class of alkyl groups having from 2 to 10 carbon atoms, hydroxyalkyl groups having from 2 to 10 carbon atoms, alkoxyalkyl groups having from 2 to 10 carbon atoms, hydroxyoxyalkyl groups having from 2 to 10 carbon atoms, alkenyl groups having from 3 to 10 carbon atoms, and monocyclic aryl and cycloalkyl groups having from 6 to 10 carbon atoms.

Representative alcohols which are useful in our process are ethanol, propanol, butanol, hexanol, allyl alcohol, crotyl alcohol, cyclohexanol, ethylene glycol, diethylene glycol, propanediol-1,2, butanediol-1,3, butanediol-1,4, hexanediol-2,5, 2-methoxyethanol, phenol, o-chlorophenol and the like.

While not wishing to be bound by any particular theory or mechanics of reaction, it, nevertheless, is believed that in our process the more readily alcoholizable chlorosilane part preferentially alcoholizes before any alcoholysis of the less readily alcoholizable chlorosilane part. In this reaction the more readily alcoholizable chlorosilane part reacts with the alcohol and is converted into the corresponding ester or mixtures thereof which contain at least one silicon bonded RO— group to the molecule, wherein RO— represents the alcohol residue. This alcoholysis is depicted by the foregoing equation. Hydrogen chloride is formed during the reaction and is advantageously rendered ineffective in promoting or participating in undesirable side reactions by removal or other means. The esters, or alcoholized chlorosilane part, so formed and the unalcoholized chlorosilane part widely differ in physical properties and, hence, can be readily separated by conventional means, as by fractional distillation. Certain of the esters formed may be solids that precipitate from the reaction mixture and, thus, are easily separated from the unalcoholized part by decantation, extraction or distillation. Solid esters are more likely to form when high molecular weight alcohols are used in the alcoholysis. When liquid esters are formed the alcoholized part can be separated from the unalcoholized part by extraction or distillation. Other physical means for separating the alcoholized and unalcoholized parts are known. Preferred means for accomplishing separation is volatilization of the unalcoholized part at atmospheric, sub-atmospheric or super-atmospheric pressure, as desired. The unalcoholized chlorosilane part can be put through our process again, and as many times as is desirable, to produce chlorosilanes of even higher purity.

Hydrogen chloride can be rendered ineffective for promoting or participating in undesirable side reactions by encouraging its evolution by the use of sub-atmospheric pressures or other means, by adding a tertiary amine to combine with HCl forming an inert salt or by other suitable means. However, it may not be desirable to use a tertiary amine or any other materials which might be capable of reacting with any component of the reaction mixture other than HCl.

In order for our process to operate efficiently, the alcohol and chlorosilane mixture should be in intimate reactive contact with each other. In other words, they should form a uniform reaction mixture or solution, so as to react under homogeneous conditions. Most chlorosilanes are miscible with most alcohols and the simple mechanical mixing of the two is sufficient to bring them into intimate reactive contact. When the chlorosilane mixture and alcohol are immiscible, they can be advantageously brought into intimate reactive contact by dissolving them in a solvent. Suitable common solvents include dioxane, diethyl ether, tetrahydrofuran, diethylene glycol diethers, and the like. The amount of solvent employed, the amount thereof is not critical as long as it is sufficient to maintain a uniform reaction mixture and it is not so great that dilution or low concentration impractically retards the rate of alcoholysis. From about 5 parts to 500 parts by weight of solvent per 100 parts of the aggregate weight of alcohol and chlorosilane mixture have been found to be efficient. Excellent results have been obtained in the experiments we have conducted by using from 20 parts to 200 parts by weight of solvent per 100 parts of the aggregate weight of alcohol and chlorosilane mixture. A solvent can be used, if desired, even when the alcohol and chlorosilane mixture are miscible.

The relative amount of the alcohol used in this invention need not be narrowly critical. Amounts of alcohol that provide from about 1 to about 5 equivalents of hydroxyl groups per mole of the more readily alcoholizable chlorosilane part have been found advantageous in our process. Amounts of alcohol that provide from about 1 to about 3 equivalents of hydroxyl groups per mole of the more readily alcoholizable chlorosilane part have been found to provide particularly advantageous results. Theoretically 1 hydroxyl equivalent of the alcohol is required to alcoholize 1 mole of chlorosilane. When an amount of alcohol that provides less than 1 equivalent of hydroxyl groups per mole of the more readily alcoholizable part is used, conversion of most or all of said alcoholizable part is not thought to take place and, hence, complete separation of the chlorosilane mixture may not be achieved. When an amount of alcohol that provides more than about 5 equivalents of hydroxyl groups per mole of the more readily alcoholizable chlorosilane part is employed, some of the less readily alcoholizable chlorosilanes may be converted to esters and, hence, lower yields of said less readily alcoholizable chlorosilanes may be obtained. Other than the indicated relative amounts of the alcohol can be used in this invention but no commensurate advantage is gained thereby.

The temperature at which the reaction mixture of the alcohol and the chlorosilane mixture is maintained also is not narrowly critical. The lowest practical temperature is, of course, the freezing point of the alcohol-chlorosilane reaction mixture or that temperature at which the rate of alcoholysis is so low as to be impractical. The highest practical temperature, of course, is that temperature at which the relative rates of alcoholysis of the specific chlorosilanes in the mixture become substantially indistinguishable. In this connection, the relative rates of alcoholysis of chlorosilanes appear to be more widely separated at the lower temperatures. Thus, the higher the temperature, the lower the yield of unalcoholized chlorsilane obtained. Accordingly, our process is advantageously carried out at temperatures below about 130° C. and above about —78° C. Superatmospheric pressures may be employed to prevent the evolution of gaseous water or chlorosilanes. We have found that when our process is conducted at temperatures in the range of about —40° C. to +30° C. excellent results by way of high yield and short reaction times are obtained.

Reaction times also are not narrowly critical in the practice of our process. The reaction time can be varied in accordance with needs and desires with respect to the yield and purity (i.e., freedom from quantities of the more readily alcoholizable chlorosilane part) of the unalcoholized chlorosilane part. At the lower reaction temperatures longer reaction times are required than at the higher reaction temperatures in order to produce an unalcoholized chlorosilane part of a particular purity. When the amount of alcohol employed is greater than that required to stoichiometrically react with the more readily alcoholizable chlorosilane part, longer reaction times tend to reduce the yield of the unalcoholized chlorosilane part because of alcoholysis. We have found that reaction times up to 100 hours can be used but prefer reaction times not greater than 20 hours.

Our process is especially useful in purifying chlorosilanes that are mixed with one or more different chlorosilanes. By way of illustration this invention is useful in reducing the amounts of tetrachlorosilane and methyltrichlorosilane in trimethylchlorosilane and in reducing the amounts of methyltrichlorosilane in dimethyldichlorosilane. Trimethylchlorosilane and dimethyldichlorosilane purified by our process are sufficiently freed from the tri- and tetrafunctional chlorosilanes so that silicone oils of controlled viscosity can be produced therefrom without gelation.

This invention is useful in separating the mixtures of chlorosilanes produced by the disproportionation of organochlorosilanes.

The esters formed as alcoholized chlorosilanes in our process are useful materials. By way of illustration, such esters can be converted into oils, gums or resins by known hydrolysis, condensation and equilibration operations.

The following examples illustrate the present invention. In the examples mole percentages are based on total moles of the chlorosilane mixture and room temperatures are temperatures from 20° C. to 30° C. In all examples, recovery of the unalcoholized chlorosilanes amounted to more than about 80 percent based on the particular chlorosilane in the original chlorosilane mixture.

EXAMPLE I

Four experiments were performed using our process to separate mixtures of chlorosilanes. The mixture of chlorosilanes used in Experiments 1 through 3 contained about 4.9 mole percent of methyltrichlorosilane and about 95.1 mole percent of dimethyldichlorosilane. The mixture of chlorosilanes used in Experiment 4 contained about 5 mole percent methyltrichlorosilane and about 95.0 mole percent of dimethyldichlorosilane. In each experiment, 3 moles of the alcohol per mole of the methyltrichlorosilane were used. The following procedure illustrates the procedure used in each of the five experiments. The chlorosilane mixture was placed in a one-pint bottle and was chilled by immersing the bottle in Dry Ice for 0.5 hour. The alcohol was chilled with Dry Ice and added to the chlorosilane mixture in the bottle. The reaction mixture so formed was maintained at 0° C. for 22 hours by immersing the bottle in a constant temperature bath. The reaction mixture was then heated to 70° C., a distillate was produced and this distillate was collected. The distillate was analyzed using a mass spectrometer. The following table gives the data obtained in the four experiments.

| Experiment | Alcohol | Composition after Purification | |
|---|---|---|---|
| | | $MeSiCl_3$ (mole percent) | $Me_2SiCl_2$ (mole percent) |
| 1 | n-butanol | 0.4 | 99.6 |
| 2 | sec.-butanol | 0.4 | 99.6 |
| 3 | isobutanol | 1.5 | 98.5 |
| 4 | crotyl alcohol | 0.29 | 99.7 |

EXAMPLE II

A chlorosilane mixture (150 pounds) having the components listed in the table below was placed in a glass-lined water-cooled kettle to which was attached a refrigerated reflux condenser. Ethyl alcohol (57 pounds) was added to the kettle over a 1.5 hour period. During the addition of the alcohol to the kettle, the contents of the kettle were continuously agitated and were maintained at a temperature from 15° C. to 22° C. The amount of alcohol was 2.5 moles of alcohol per mole of the trifunctional and tetrafunctional chlorosilanes. After the addition of the alcohol was completed, the contents of the kettle were refluxed at a temperature between 50° C. and 60° C. for one hour. The reaction product so obtained was transferred to a glass-lined, 50 gallon still and was heated in the still up to 58° C. A distillate (59 pounds, 2 ounces) was produced during this heating and was collected. This distillate had the composition shown in Table I.

Table I

| Component | Composition Before Purification (mole percent) | Composition After Purification (mole percent) |
|---|---|---|
| $MeSiCl_3$ | 25.4 | 0.2 |
| $Me_2SiCl_2$ | 3.4 | 0.6 |
| $Me_3SiCl$ | 60.3 | 99.2 |
| $SiCl_4$ | 3.2 | 0.0 |
| $MeSiHCl_2$ | 7.8 | 0.0 |

Trimethylchlorosilane was obtained in 74 percent yield based on the $Me_3SiCl$ in the original chlorosilane mixture.

A second chlorosilane mixture having the composition listed in Table II below was used in a process similar to the one described above. A distillate having the composition set forth in Table II was obtained.

Table II

| Component | Composition Before Purification (mole percent) | Composition After Purification (mole percent) |
|---|---|---|
| $Me_3SiCl$ | 72.0 | 99.9 |
| $Me_2SiCl_2$ | 1.3 | 0.0 |
| $MeSiCl_3$ | 19.0 | 0.0 |
| $SiCl_4$ | 7.7 | 0.0 |
| $MeSiHCl_2$ | 0.0 | 0.1 |

Trimethylchlorosilane was obtained in better than 72 percent yield based on the amount of $Me_3SiCl$ in the original chlorosilane mixture.

EXAMPLE III

Three experiments were performed using our process to separate chlorosilane mixtures. The chlorosilane mixtures used in these experiments contained about 5.1 mole percent of methyltrichlorosilane and 94.8 mole percent of dimethyldichlorosilane. In each experiment an amount of the indicated alcohol that provided 3 equivalents of hydroxyl groups per mole of methyltrichlorosilane was used. The following procedure illustrates the procedure used in each of the three experiments. The chlorosilane mixture was placed in a one-pint bottle and was chilled by immersing the bottle in Dry Ice for 0.5 hour. The alcohol was chilled with Dry Ice and added to the mixture of chlorosilanes in the bottle. The reaction mixture so formed was maintained at 0° C. for 22 hours by immersing the bottle in a constant temperature bath. The reaction mixture was then heated to 70° C., a distillate was produced and this distillate was collected. The distillate was analyzed using a mass spectrometer. The following table gives the respective alcohols used and the respective compositions of the distillate obtained in the three experiments.

| Experiment | Alcohol | Compositions after Purification | |
|---|---|---|---|
| | | $MeSiCl_3$ (mole percent) | $Me_2SiCl_2$ (mole percent) |
| 1 | butanediol-1,3 | 0.46 | 99.5 |
| 2 | butanediol-1,4 | 0.31 | 99.7 |
| 3 | hexanediol-2,5 | 2.20 | 97.8 |

EXAMPLE IV

A chlorosilane mixture having the composition listed in Table I below was charged to a pot, cooled to 10° C. and 2 moles of ethanol per mole of tetrachlorosilane plus 2 moles of ethanol per mole of methyltrichlorosilane were rapidly added while maintaining the pot temperature below 30° C. After all ethanol had been added a packed column (about 10 to 15 plates) was attached to the pot and the pot contents were refluxed for a few minutes at atmospheric pressure until the head temperature levelled off. The pot contents were rapidly distilled to a head temperature of about 60° C. The distillate obtained was analyzed and was found to contain no other chlorosilanes than trimethylchlorosilane.

Table I

| Component | Composition Before Purification (mole percent) | Composition After Purification (mole percent) |
|---|---|---|
| $Me_3SiCl$ | 72.1 | 100 |
| $SiCl_4$ | 22.8 | 0 |
| $MeSiCl_3$ | 1.5 | 0 |
| $MeHSiCl_2$ | 3.4 | 0 |
| $Me_2SiCl_2$ | 0.2 | 0 |

The yield of trimethylchlorosilane was 97.0 percent of theoretical.

The process described above was conducted again with a different chlorosilane mixture. The chlorosilane compositions of the mixture before and after purification are shown in the table below:

Table II

| Component | Composition Before Purification (mole percent) | Composition After Purification (mole percent) |
|---|---|---|
| $Me_3SiCl$ | 71.5 | 100 |
| $SiCl_4$ | 24.2 | 0 |
| $MeSiCl_3$ | 1.4 | 0 |
| $MeHSiCl_2$ | 2.6 | 0 |
| $Me_2SiCl_2$ | 0.3 | 0 |

The yield of trimethylchlorosilane was 94.3 percent of theoretical.

EXAMPLE V

To a chlorosilane mixture having the composition listed in the table below there was added a sufficient amount of butanediol-1,4 to react with all of the chlorine atoms over two contained by the trichlorosilane and tetrachlorosilane molecules of the chlorosilane mixture. A 15 weight percent of butanediol-1,4 over this amount also was added. The solution thus formed was maintained at −15° C. for 16 hours and then was distilled in a 10-plate column. In distilling a 9 weight percent foreshot was taken off and then purified chlorosilane was stripped to 42° C. A purified chlorosilane having the composition shown in the table was obtained.

| Component | Component Boiling Point (° C. at atmospheric pressure) | Composition Before Purification (weight percent) | Composition After Purification (weight percent) |
|---|---|---|---|
| $MeHSiCl_2$ | 41.0 | 80.8 | 95.6 |
| $SiCl_4$ | 57.6 | 6.5 | 1.7 |
| $HSiCl_3$ | 31.8 | 2.4 | 0.0 |
| $Me_2SiCl_2$ | 70.0 | 3.3 | 1.0 |
| $MeSiCl_3$ | 65.7 | 0.56 | 0.4 |
| $Me_3SiCl$ | 57.5 | 0.86 | 1.3 |

EXAMPLE VI

Two-hundred grams of a chlorosilane mixture containing about 62.5 grams of bistrichlorosilylbenzene and the remainder diphenyldichlorosilane were dissolved in 100 cubic centimeters of benzene. To the resulting solution 36.2 grams of cyclohexanol was added. The resulting mixture was stirred and brought to a temperature of 102° C. The reaction mixture was refluxed at 102° C. under atmospheric pressure for 30 minutes, after which time benzene was stripped to a kettle temperature of 240° C. The reaction mixture was then vacuum distilled to produce diphenyldichlorosilane of 93 percent purity. The yield of diphenyldichlorosilane was 93.5 percent of the diphenyldichlorosilane in the original chlorosilane mixture.

The above procedure was repeated, however, using a 5 weight percent excess of cyclohexanol and omitting the solvent, benzene. Diphenyldichlorosilane thus produced had a purity of 99 percent.

What is claimed is:

1. A process for separating chlorosilane mixtures containing a first chlorosilane part and a second chlorosilane part, the first chlorosilane part being more rapidly alcoholizable than the second chlorosilane part, said process comprising contacting the chlorosilane mixture with an alcohol, said contact time being less than that required to completely alcoholize all chlorosilanes in said mixture thereby forming an alcoholized chlorosilane part and an unalcoholized chlorosilane part, and thereafter separating the unalcoholized chlorosilane part from the alcoholized chlorosilane part.

2. A process for separating chlorosilane mixtures containing a first chlorosilane part and a second chlorosilane part, the first chlorosilane part being more rapidly alcoholizable than the second chlorosilane part, said process comprising contacting the chlorosilane mixture with an alcohol in an amount containing from 1 to 5 hydroxyl equivalents per mole of said first chlorosilane part, said contact time being less than that required to completely alcoholize all chlorosilanes in said mixture thereby forming an alcoholized chlorosilane part and an unalcoholized chlorosilane part, and thereafter separating the unalcoholized chlorosilane part from the alcoholized chlorosilane part.

3. A process as claimed in claim 2 wherein the alcohol is ethanol.

4. A process as claimed in claim 2 wherein the alcohol is cyclohexanol.

5. A process as claimed in claim 2 wherein the alcohol is butanediol.

6. A process as claimed in claim 2 wherein the alcohol is butanol.

7. A process as claimed in claim 2 wherein the alcohol is hexanediol.

8. A process as claimed in claim 2 wherein the alcohol is o-chlorophenol.

9. A process for separating chlorosilane mixtures containing a first chlorosilane part and a second chlorosilane part, the first chlorosilane part being more rapidly alcoholizable than the second chlorosilane part, said process comprising contacting the chlorosilane mixture with an alcohol selected from the class consisting of monohydric and dihydric, aliphatic, cycloaliphatic and aromatic alcohols, in an amount containing from 1 to 5 hydroxyl equivalents per mole of said first chlorosilane part, said contact time being less than that required to completely alcoholize all chlorosilanes in said mixture thereby forming an alcoholized chlorosilane part and an unalcoholized chlorosilane part, and thereafter separating the unalcoholized chlorosilane part from the alcoholized chlorosilane part.

10. A process as claimed in claim 9 wherein the first chlorosilane part is methyltrichlorosilane and the second chlorosilane part is dimethyldichlorosilane.

11. A process as claimed in claim 9 wherein the first chlorosilane part is tetrachlorosilane and the second chlorosilane part is trimethylchlorosilane.

12. A process for separating chlorosilane mixtures containing a first chlorosilane part and a second chlorosilane part, the first chlorosilane part being more rapidly alcoholizable than the second chlorosilane part, said process comprising contacting at −40° C. to +30° C. the chlorosilane mixture with an alcohol selected from the class consisting of monohydric and dihydric, aliphatic, cycloaliphatic and aromatic alcohols, in an amount containing from 1 to 5 hydroxyl equivalents per mole of said first chlorosilane part, said contact time being less than that required to completely alcoholize all chlorosilanes in said mixture thereby forming an alcoholized chlorosilane part and an unalcoholized chlorosilane part, and thereafter separating the unalcoholized chlorosilane part from the alcoholized chlorosilane part.

13. A process for separating chlorosilane mixtures containing a first chlorosilane and a second chlorosilane, the first chlorosilane being more rapidly alcoholizable than the second chlorosilane, said process comprising contacting the chlorosilane mixture with an alcohol, said contact time being less than that required to completely alcoholize all chlorosilanes in said mixture thereby forming alcoholized chlorosilanes and unalcoholized chlorosilanes and thereafter separating said unalcoholized from said alcoholized chlorosilanes.

14. A process for separating chlorosilane mixtures containing a first chlorosilane and a second chlorosilane the first chlorosilane being more rapidly alcoholized than the second chlorosilane, said process comprising contacting the chlorosilane mixture with an alcohol in an amount containing from 1 to 5 hydroxyl equivalents per mole of said first chlorosilane, said contact time being less than that required to completely alcoholize all chlorosilanes in said mixture thereby forming alcoholized chlorosilanes and unalcoholized chlorosilanes and thereafter separating said unalcoholized from said alcoholized chlorosilanes.

15. A process for separating chlorosilane mixtures containing a first chlorosilane and a second chlorosilane, the first chlorosilane being more rapidly alcoholizable than the second chlorosilane, said process comprising contacting the chlorosilane mixture with an alcohol selected from the class consisting of monohydric and dihydric, aliphatic, cycloaliphatic and aromatic alcohols, in an amount containing from 1 to 5 hydroxyl equivalents per mole of said first chlorosilane, said contact time being less than that required to completely alcoholize all chlorosilanes in said mixture thereby forming alcoholized chlorosilanes and unalcoholized chlorosilanes, and thereafter separating said unalcoholized from said alcoholized chlorosilanes.

16. A process for separating a chlorosilane mixture containing a trichlorosilane and a dichlorosilane, the trichlorosilane being more rapidly alcoholizable than the dichlorosilane, said process comprising contacting the chlorosilane mixture with an alcohol in an amount containing not less than 1 hydroxyl equivalent per mole of said trichlorosilane, said contact time being less than that required to completely alcoholize all chlorosilanes in said mixture thereby forming alcoholized trichlorosilane and unalcoholized dichlorosilane, and thereafter separating the unalcoholized from the alcoholized chlorosilanes.

17. A process for separating a chlorosilane mixture containing a trichlorosilane and a dichlorosilane, the trichlorosilane being more rapidly alcoholizable than the dichlorosilane, said process comprising contacting the chlorosilane mixture with an alcohol selected from the class consisting of monohydric and dihydric, aliphatic, cycloaliphatic and aromatic alcohols in an amount containing from 1 to 5 hydroxyl equivalents per mole of said trichlorosilane, said contact time being less than that required to completely alcoholize all chlorosilanes in said mixture thereby forming alcoholized trichlorosilane and unalcoholized dichlorosilane, and thereafter separating the unalcoholized from the alcoholized chlorosilanes.

18. A process for separating a chlorosilane mixture containing a polychlorosilane part and a monochlorosilane, the polychlorosilane part being more rapidly alcoholizable than the monochlorosilane, said process comprising contacting the chlorosilane mixture with an alcohol in an amount containing not less than 1 hydroxyl equivalent per mole of said polychlorosilane part, said contact time being less than that required to completely alcoholize all chlorosilanes in said mixture thereby forming an alcoholized polychlorosilane part and unalcoholized monochlorosilane, and thereafter separating the unalcoholized from the alcoholized chlorosilanes.

19. A process for separating a chlorosilane mixture containing a polychlorosilane part and a monochlorosilane, the polychlorosilane part being more rapidly alcoholizable than the monochlorosilane, said process comprising contacting the chlorosilane mixture with an alcohol selected from the class consisting of monohydric and dihydric, aliphatic, cycloaliphatic and aromatic alcohols in an amount containing from 1 to 5 hydroxyl equivalents per mole of said polychlorosilane part, said contact time being less than that required to completely alcoholize all chlorosilanes in said mixture thereby forming an alcoholized polychlorosilane part and unalcoholized monochlorosilane, and thereafter separating the unalcoholized from the alcoholized chlorosilanes.

20. A process for separating a chlorosilane mixture containing (1) a chlorosilane part comprising a dihydrocarbyldichlorosilane, trichlorosilane and tetrachlorosilane and (2) a monohydrocarbyldichlorosilane, the chlorosilane part being more rapidly alcoholizable than the monohydrocarbyldichlorosilane, said process comprising contacting the chlorosilane mixture with an alcohol in an amount containing not less than 1 hydroxyl equivalent per mole of said chlorosilane part, such contact time being less than that required to completely alcoholize all chlorosilanes in said mixture thereby forming an alcoholized chlorosilane part and unalcoholized monohydrocarbyldichlorosilane, and separating the alcoholized chlorosilane part from the monohydrocarbyldichlorosilane.

21. A process for separating a chlorosilane mixture containing (1) a chlorosilane part comprising a dihydrocarbyldichlorosilane, trichlorosilanes and tetrachlorosilane and (2) a monohydrocarbyldichlorosilane, the chlorosilane part being more rapidly alcoholizable than the monohydrocarbyldichlorosilane, said process comprising contacting the chlorosilane mixture with an alcohol selected from the class consisting of monohydric and dihydric, aliphatic, cycloaliphatic and aromatic alcohols in an amount containing from 1 to 5 hydroxyl equivalents per mole of said chlorosilane part, said contact time being less than that required to completely alcoholize all chlorosilanes in said mixture thereby forming an alcoholized chlorosilane part and unalcoholized monohydrocarbyldichlorosilane, and thereafter separating the alcoholized chlorosilane part from the monohydrocarbyldichlorosilane.

References Cited in the file of this patent

UNITED STATES PATENTS

| | | |
|---|---|---|
| 2,485,366 | DiGiorgio et al. | Oct. 18, 1949 |
| 2,706,724 | Bass | Apr. 19, 1955 |

FOREIGN PATENTS

| | | |
|---|---|---|
| 612,646 | Great Britain | Nov. 16, 1948 |
| 467,303 | Italy | Dec. 3, 1951 |
| 936,038 | Germany | Dec. 1, 1955 |

OTHER REFERENCES

Hyde: "Jr. Am. Chem. Soc.," vol. 77 (1955), p. 3140–1.